(No Model.) 2 Sheets—Sheet 2.

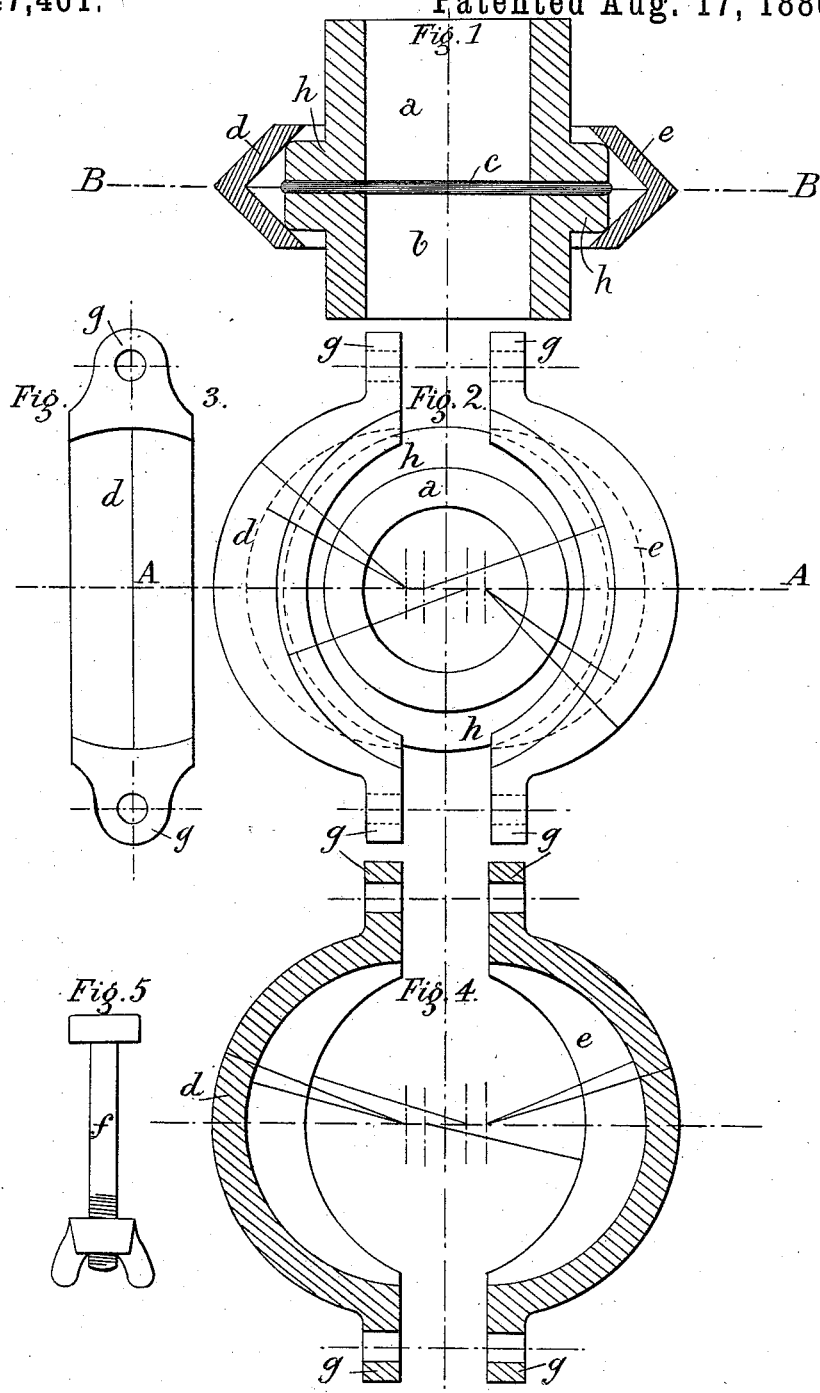

G. O. L. LEPRÉVOST-BOURGEREL.
PIPE COUPLING.

No. 347,461. Patented Aug. 17, 1886.

UNITED STATES PATENT OFFICE.

GEORGES OLIVIER LOUIS LEPRÉVOST-BOURGEREL, OF PARIS, FRANCE.

PIPE-COUPLING.

SPECIFICATION forming part of Letters Patent No. 347,461, dated August 17, 1886.

Application filed June 1, 1885. Serial No. 167,163. (No model.) Patented in France April 16, 1885, No. 168,311; in England May 19, 1885, No. 6,097; in Germany September 3, 1885, No. 35,501, and in Belgium December 18, 1885, No. 71,279.

*To all whom it may concern:*

Be it known that I, GEORGES OLIVIER LOUIS LEPRÉVOST-BOURGEREL, student at the fine arts school of Paris, residing in Paris, France, have invented certain new and useful Improvements in Pipe-Couplings; and I do hereby declare that the following is a full, clear, and exact description of the same.

My invention relates to that class of couplings in which two flanged pipes placed end to end are held by an independent device which establishes the tightness of the joint.

My invention is applicable as couplings for pipes for conveying compressed air, water, or any fluid generally.

My pipe-coupling is constituted by two halves, which are constructed in the peculiar manner hereinafter set forth.

Figure 7:
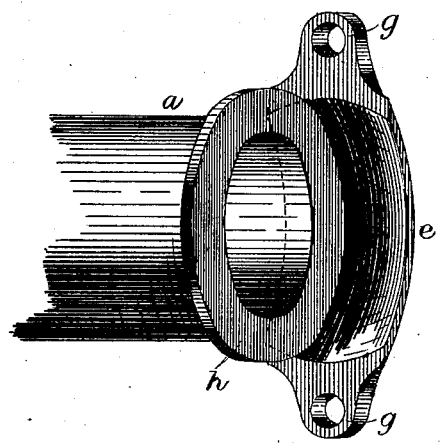
Figure 6:
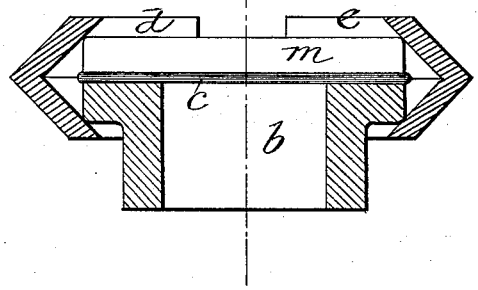

Figure 1 is a sectional elevation taken through A A, Fig. 2, of a pipe-coupling embodying my invention. Fig. 2 is a top view of the same. Fig. 3 is a side view of one-half of the coupling, Fig. 2. Fig. 4 is a top view of the coupling in section through B B, Fig. 1. Fig. 5 shows a connecting-bolt. Fig. 6 shows the application of the coupling to the closing of an open pipe, and Fig. 7 a perspective view of one of the pipes and one of the halves of the coupler arranged in relation to each other.

$a\ b$ are the two pipes to be coupled. $c$ is an interposed washer of rubber or other suitable material. $d\ e$ are the two halves of the coupling, connected by two bolts, $f$, passing through lugs $g\ g\ g\ g$. One of the bolts may be dispensed with and be replaced by a joint.

The effort exerted upon tightening the two halves against the rounded-off edges of the flanges $h\ h$ of the pipes $a\ b$ may be resolved into two forces, of which one is at right angles to the axis of the pipes and the other is parallel to the same axis. Now, the former force passing through the axis of the pipes is annulled, because it is exerted similarly against the entire edge of each of the flanges $h\ h$, so that the latter force only acts to press both pipes against each other. The effort thus exerted by the coupling is uniform at all points of the said flanges $h\ h$. Each half $d\ e$ forms in section a V, which is more or less open according to the point at which the section is taken. For instance, taken half-way between the two ends of each half, the extent of opening of the V will be that shown in Fig. 1, whereas if taken at any other point the V will be more open, and, finally, the extent of opening will be that shown in Fig. 3, being the end of the half—that is to say, the inner face of each half forms a vault in and against which the edge of the flange can bear and come in contact.

Upon reference to Fig. 2 it will be seen that in all its horizontal planes the vault corresponds to the circumference which constitutes the edge of the flange $h$. By these means, if a thin or a thick washer is interposed, or if a flange is more or less thick than another, the displacement of the point of contact will not in any way alter the action of the coupling, the said inner face being so formed that in whatever horizontal plane it may be looked at in cross-section it always forms a portion of a circumference the radius of which is the same as the radius of the circumference constituting the edge of the flange $h$.

In Fig. 6 I have shown the application of the herein-described construction of coupling to the closing of an open pipe. $d\ e$ are the two halves, made as hereinbefore described. $b$ is the pipe the opening of which is desired to be closed. $c$ is a rubber or other suitable washer, and $m$ is a disk of rigid material. In this case the disk takes the place of the other pipe, $a$. The angle formed by the inner face of the halves $d\ e$ to the axis of the pipes is forty-five degrees at the section shown in Fig. 1; but it may vary more or less.

I claim—

1. A pipe-coupling made in two parts, in each of which the inner faces are formed by two walls, which not only meet at an angle, but in which such angle is made gradually greater from the center to the ends of these faces, substantially as set forth.

2. A pipe-coupling made in two parts or halves, $d\ e$, each of such halves having substantially a uniform width, the inner faces of each part meeting at an angle, which angle is gradually larger or wider from the center toward both ends of each part, as set forth, and in which halves the arcs of such inner faces, taken in any and all parallel planes, are arcs of a circle, and have the same radius though struck from different points, all substantially as shown and described.

3. In combination with pipes having flanges which are substantially rectangular in cross-section, a coupling made in two rigid parts or halves, the inner faces of which are formed of walls meeting at an angle which is gradually greater from the center to the ends of these walls, substantially as set forth.

In witness whereof I have hereunto signed my name, in the presence of two subscribing witnesses, this 6th day of May, 1885.

GEORGES OLIVIER LOUIS LEPRÉVOST-BOURGEREL.

Witnesses:
    ROBT. M. HOOPER,
    A. LE CANN.